Sept. 18, 1951 — J. M. CAGE — 2,568,486
HIGH-VOLTAGE POWER SUPPLY
Filed July 6, 1949 — 6 Sheets-Sheet 1

INVENTOR
JOHN M. CAGE
BY
ATTORNEYS

Sept. 18, 1951          J. M. CAGE          2,568,486

HIGH-VOLTAGE POWER SUPPLY

Filed July 6, 1949          6 Sheets-Sheet 4

Fig.10.

INVENTOR
JOHN M. CAGE
BY
ATTORNEYS

Sept. 18, 1951

J. M. CAGE 2,568,486

HIGH-VOLTAGE POWER SUPPLY

Filed July 6, 1949

INVENTOR
JOHN M. CAGE
BY
ATTORNEYS

Sept. 18, 1951 J. M. CAGE 2,568,486
HIGH-VOLTAGE POWER SUPPLY
Filed July 6, 1949 6 Sheets-Sheet 6

INVENTOR.
JOHN M. CAGE
BY
ATTORNEYS

Patented Sept. 18, 1951

2,568,486

UNITED STATES PATENT OFFICE 2,568,486

HIGH-VOLTAGE POWER SUPPLY

John M. Cage, Montclair, N. J., assignor to Cage Projects, Inc., Union City, N. J., a corporation of New Jersey Application July 6, 1949, Serial No. 103,276

7 Claims. (Cl. 321—2)

This invention relates to electronic circuits for television and other purposes, and is a continuation-in-part of my United States patent application filed October 4, 1947, Serial No. 777,955, entitled "Television," and my United States patent application filed November 29, 1947, Serial No. 788,818, entitled "Electronic Circuit for Image Reproducing Tubes and Power Supplies Therefor."

One object of this invention is a new and improved power supply characterized by the simplicity of arrangement of components, and one that is readily adaptable to large quantity production at a relatively low cost.

Another object of the invention is a new and improved voltage multiplier power supply formed of a number of independent and readily replaceable units.

Another object is to provide a new and improved arrangement of components for high voltage power supplies.

Still another object of the invention is to provide a new and improved power supply wherein the filaments of the rectifier tubes are heated by a source wholly independent of the source of energy used for obtaining the high voltage.

Another object is to provide a new and improved high voltage power supply.

The above and other objects will become more apparent in the following description of the invention, when taken in connection with the accompanying drawings.

The power supply according to the invention embodies a construction and arrangement of parts whereby voltages of the order of 50 kv. to 100 kv., and even higher, may be generated within a relatively small space and with materially reduced leakage losses. The several circuit elements are arranged in a manner to facilitate construction and servicing of the equipment, resulting in materially lower manufacturing costs, and assembly and disassembly of the components of the supply can be rapidly and easily accomplished without the need for special tools, soldering irons and the like. With my new and improved power supply including filament heating means, I am able to obtain a stable, dependable, and well filtered output voltage, and am able to materially lengthen the life of the rectifier tubes. This power supply is particularly useful for television equipment to furnish the accelerating voltage for the picture tube, with the result that an improved, reproduced image is obtained.

Figure 11:
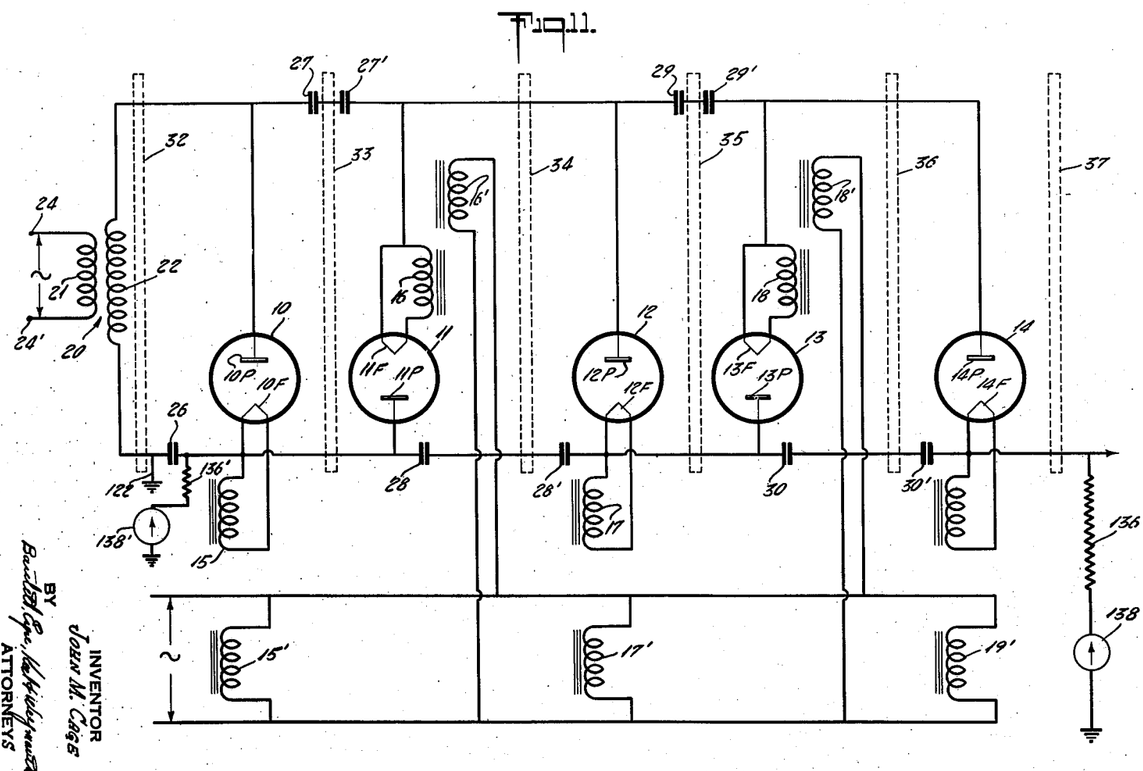
Fig. 11 is a circuit diagram of the invention.

In Fig. 11 I have illustrated one circuit diagram for a high voltage power supply embodying my invention. It is of the voltage multiplier type embodying a plurality of rectifier tubes arranged in circuit with a number of condensers to effect voltage multiplication. The tubes are denoted by the numerals 10 to 14, each having a plate and filament denoted by the letters P and F, respectively. In the case of tube 10, for instance, the plate is denoted by 10P and the filament by 10F.

The filaments F of the tbes 10 to 14 are heated by separate coils 15 to 19, respectively, by voltages induced therein by the individual primary coils 15' to 19'. Coils 15' to 19' are connected in parallel across a suitable alternating current supply, such as, for instance, one having a frequency of 60 cycles per second. Higher frequency sources may be used with appropriate modification of the windings 15, 15'; 16, 16'; etc., and associated cores, to handle the higher frequencies.

Power is supplied to the power supply through the transformer 20 having a primary winding 21 and a secondary winding 22. A source of alternating current is connected to the terminals 24, 24' of the transformer winding 21, and is stepped-up in the transformer to provide the desired high voltage across the secondary winding 22. The voltage appearing across the winding 22 may be of the order of 10,000 to 20,000 volts, depending upon the desired output voltage from the supply. In the particular circuit arrangement illustrated, 10,000 volts across the winding 22 would produce a total output voltage of approximately 50,000 volts; the condensers 26 through 30, and 27' through 30', and the rectifying tubes 10 to 14 being connected to effect both multiplication and rectification of the voltage.

I have also illustrated, in Fig. 11, the position of the dielectric barriers between the several stages of the supply, to show their relative position with reference to the circuit components, and these barriers are denoted by the numerals 32 to 37, respectively.

Figure 1:
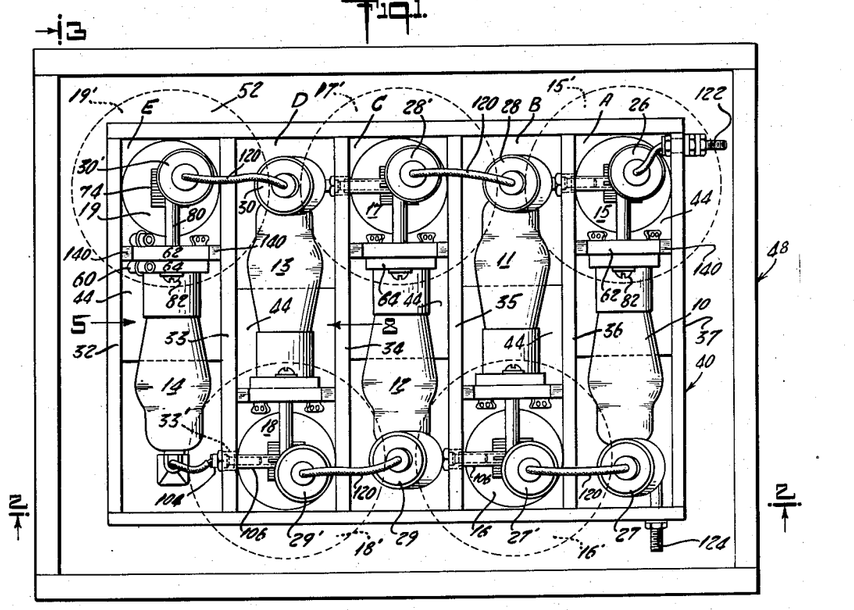
Fig. 1 is a plan view of one embodiment of the invention.
Figure 2:
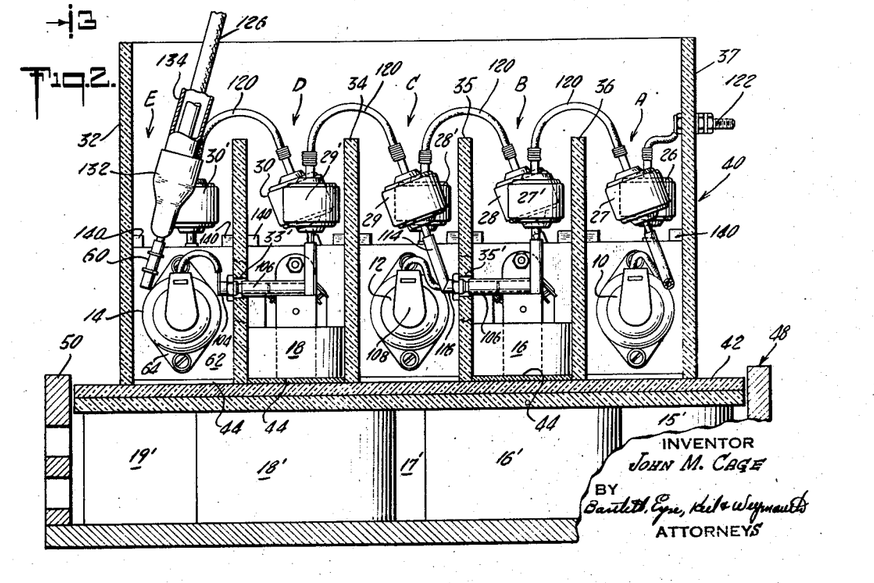
Fig. 2 is a cross-sectional view of Fig. 1, along the line 2—2 thereof.
Figure 3:
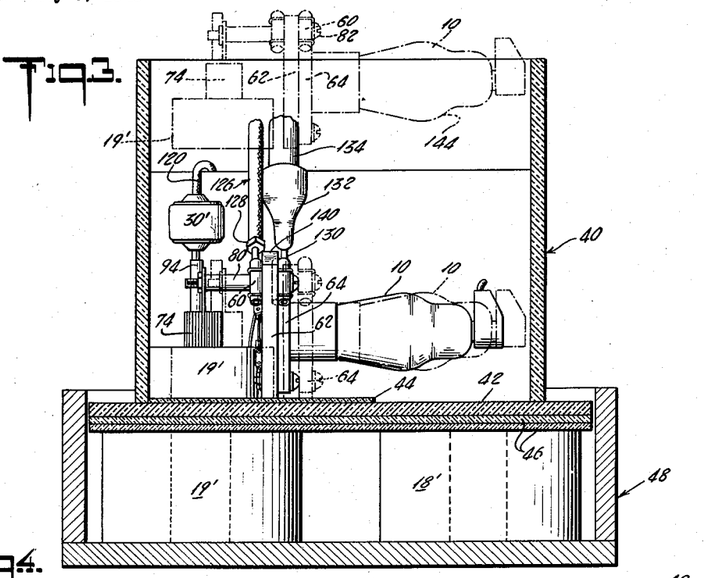
Fig. 3 is a cross-sectional view of the embodiment in Fig. 1 along the line 3—3 thereof.
Figure 4:
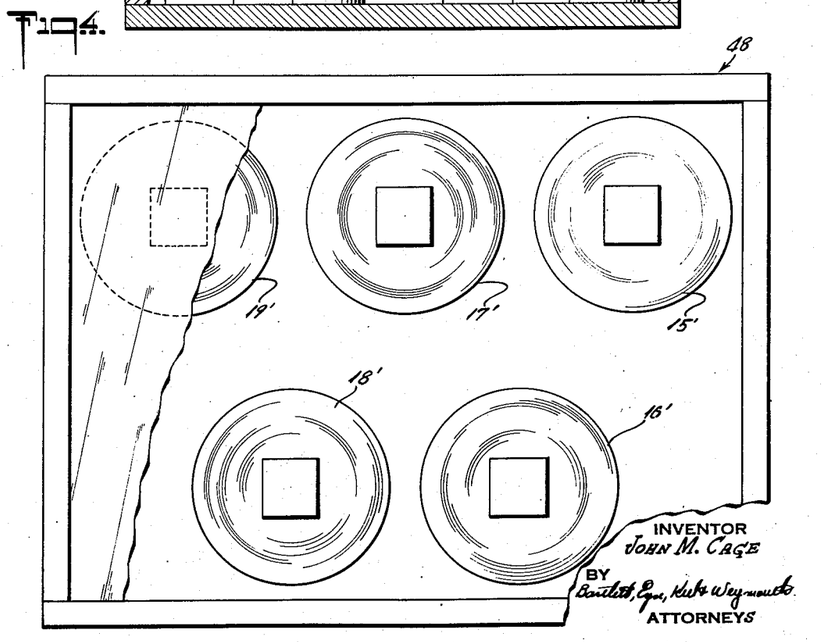
Fig. 4 is a plan view of a portion of the embodiment shown in Fig. 1.

In Figs. 1, 2 and 3 I have illustrated one embodiment of the invention, wherein the above circuit is used, and have denoted equivalent parts in these figures and in the circuit diagram of Fig. 11 by similar numerals.

Figure 10:
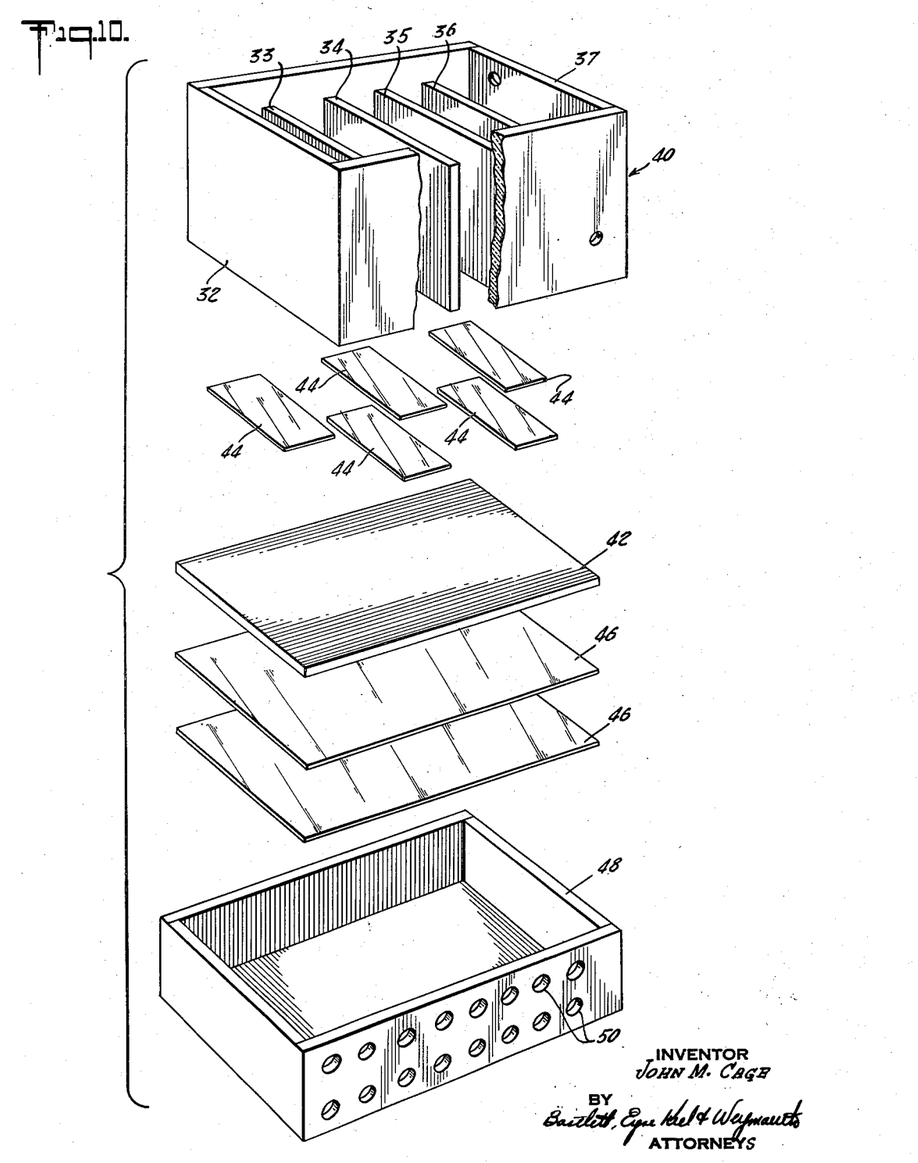
Fig. 10 is an exploded view of the housing for the embodiment shown in Fig. 1.

The housing for the power supply is more clearly illustrated in the exploded view in Fig. 10, and it consists generally of a rectangular housing of insulated material 40 having compartments formed therein by dielectric barriers 33 through 36, with the end walls of the housing forming the dielectric barriers 32 and 37. The base of the housing 40 is denoted by the numeral 42 and in the finished power supply is cemented or otherwise fastened by suitable non-metallic means to the bottom of the housing 40 so as to form a substantially unitary structure. The five plates 44 rest on the base 42 within each of the compartments of the housing 40 to provide added insulation for the filament heating circuit, as will be subsequently described. Beneath the base 42 are a pair of plates of glass or other insulating material 46 which space the base 42 from the electromagnetic-field-generating means, which is disposed within the box-like base part 48 of the housing. The field generating means are indicated by the coils 15' through 19', and are shown in Figs. 2, 3, 4 and 11. The hollow base portion 48 may be formed of wood or other suitable non-metallic material and is preferably provided with ventilating holes 50 to prevent the overheating of the field generating coils 15' to 19' when enclosed within the hollow base part.

Figs. 1, 2 and 3 show the relationship of the individual components of the power supply when assembled to form a complete unit, and is composed of two primary units, namely the housing 40 with its base 42 attached thereto, and the hollow base part 50 having the field generating coils 15' to 19' disposed therein. The components disposed in each of the compartments within the housing 40 constitute separate and distinct portions of the equipment with any one or more of the sections being separately and individually replaceable and adapted to be held in position within its own compartment upon the attachment of connecting means for interconnecting the components within the different sections. These section components or units, each of which comprises in effect a separate multiplying stage of the power supply, are illustrated in Figs. 5 through 9; and in Fig. 3, the procedure for removing one section from its compartment is illustrated.

For simplicity, the several compartments in the power supply have been designated by the letters A to E, with that apparatus in compartment A constituting the first stage of the power supply, and that in compartment E the final or high voltage stage. The stages within compartments A through D are substantially similar in structure, with only minor differences in the particular stages shown. It is readily apparent, however, that with the proper choice and arrangement of the interstage connecting means, any of these four stages A to D could be made readily interchangeable with any of the other stages.

The stage within compartment E differs from the other stages in that it is provided with a high voltage output terminal arrangement 60 disposed at the base of the tube 14. In manufacturing, however, a suitable high voltage terminal could be provided at the base of the tube of each of the multiplier stages, so that all of them would be substantially identical.

Figures 5, 6, 7, 9:
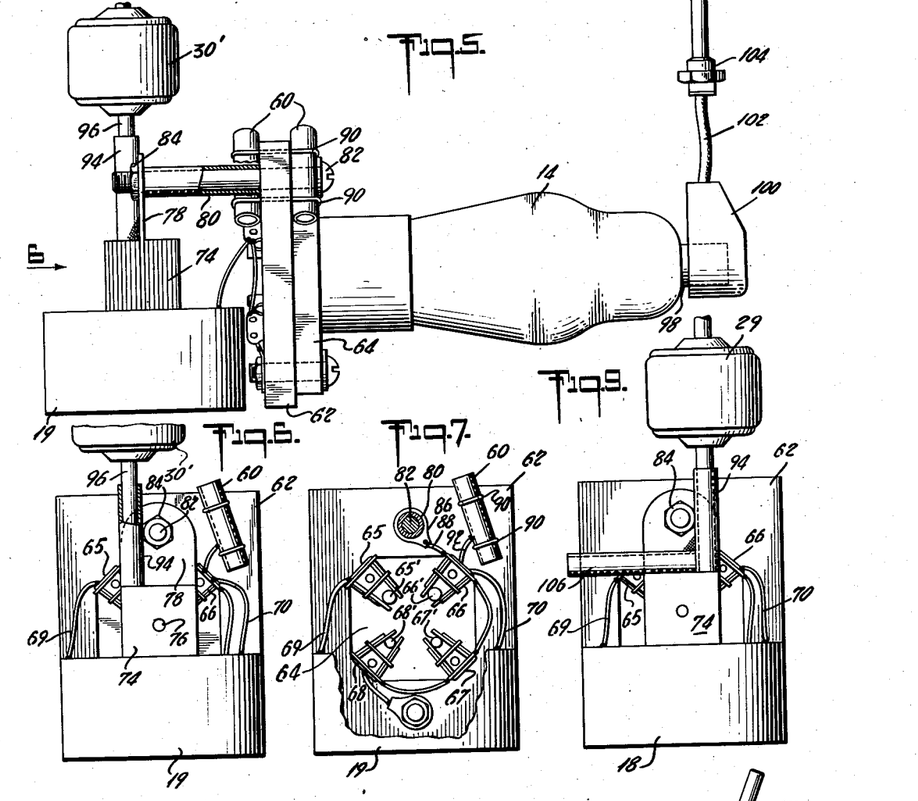
Fig. 5 is a side elevation of certain assembled circuit elements shown in Fig. 1, in accordance with the invention.
Figs. 6 and 7 are end views of the embodiment shown in Fig. 5.
Fig. 9 is an end-view of the assembly in Fig. 8.

Referring now to Figs. 5, 6 and 7, which illustrate different views of the high voltage stage within compartment E, 14 denotes the rectifying and multiplying tube supported in a horizontal position by a base part 62, on which is mounted a suitable socket 64, in the present instance having four terminals 65, 66, 67 and 68 to receive the tube prongs 65' through 68'. In this particular tube, only the prongs 65' and 66' are connected to the tube filament, the prongs 67' and 68' being left blank and provided only for the purpose of aiding in the support of the tube within the socket. The socket terminals 65 and 66 are, therefore, connected by means of leads 69 and 70 to the iron core inductor 19 for energizing the filament of the tube. The inductor 19, when positioned in the compartment, is directly over the field generating coil 19' and therefore has induced into it a voltage sufficient to energize the tube, the insulation between the coil 19 and the field generator coil 19' being sufficient to withstand the potential difference existing between the two coils, together with a suitable safety factor. The core 74 of the coil 19, which extends above the upper surface of the coil, is built up of laminations of a suitable magnetic material fastened together by a rivet 76, as shown in Fig. 6. At least one of the laminations is preferably extended beyond the top of the core 74, as denoted by the numeral 78, for the purpose of fastening the core rigidly to the base 62 by means of a spacer 80 and a bolt and nut 82 and 84, respectively.

As illustrated in Fig. 7, core 74 of the coil 19 is maintained at the potential of the coil and the tube filament by means of a connecting lug 86 and a lead 88 electrically connecting the lug to the socket terminal 66. The high voltage connection 60 includes two cylindrical terminals disposed on opposite sides of the upper corner of the base 62 and fastened thereto by straps 90 or other suitable means which, in addition to providing mechanical support, electrically connect the two terminals. The tubes are in turn connected by a short lead 92 to the filament terminals 66. A terminal 94 for the reception of a terminal 96 of condenser 30' is fastened to and supported by the upwardly extending core lamination 78. The fastening may be accomplished by welding or soldering of the terminal 94 to the laminations 78, or a suitable bracket may be provided encompassing the terminal 94 and fastened rigidly to the lamination by means of the bolt 82 and nut 84.

The condenser 30', as well as the other condensers, are formed with a cylindrical body part having cylindrical terminals extending from the ends thereof. In the present instance a terminal 96 of condenser 30' is received by the cylindrical connecting means 94 which holds the condenser rigidly in an upright position.

The tube 14 has its plate 14P connected to the tube cap 98, and a spring type clip connector 100 is adapted to receive and be secured to the tube cap. This connector 100 is provided with a short lead 102 which is connected to a plug type connector 104 which serves the dual purpose of connecting the last stage to the preceding stage (compartment D, Fig. 1), and also as a locking means for locking the stage or unit disposed in compartment D in position therein.

As the units in compartments A through D are substantially identical, only the unit in compartment D will be described, and this unit has been illustrated in Figs. 8 and 9. The arrangement of the components of stage D is identical with the arrangement of the components in stage E, previously described, with the exception of a horizontal cylindrical terminal part 106 (Fig. 9) which serves as an electrical connecting means, as well as means for locking the unit in its compartment. The tube cap connector 108 and its associated terminal 110, also differ slightly from the cap and terminal elements 100, 102, 104 of Fig. 5, but this portion of the stage forms a separate and distinct item, readily removable, and does not constitute a structural difference between the units or stages D and E.

Figure 8:
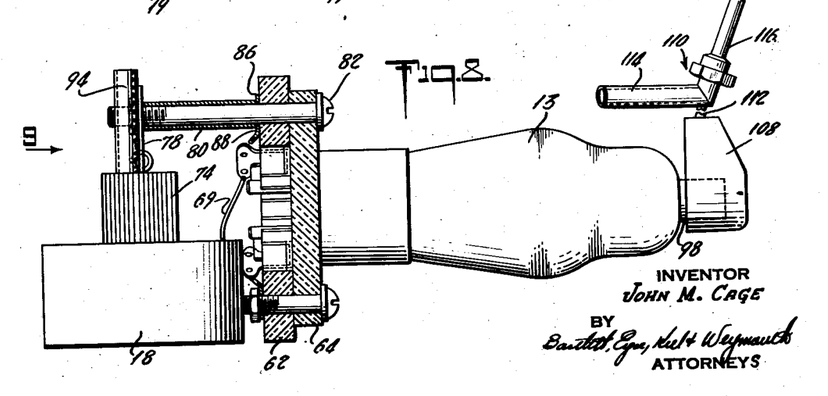
Fig. 8 is a side elevation of another set of elements assembled in accordance with the invention.

Like numbers have been used to designate similar components and structural arrangements in Figs. 5 and 8, with the exception, however, of the filament heating coil 18 and the tube 13 in Fig. 8, which have been numbered to correspond to the designations given these components in certain of the other figures, as for instance Figs. 1 and 11.

The terminal 106 in Fig. 9 is disposed in a horizontal position and is mechanically supported by and electrically connected to the core part 74 of the coil 18. This core part 74 as described in connection with Figs. 5, 6 and 7, is electrically connected to terminal 66 of the socket which engages one of the tube filament prongs, so that the potential of the core is at the potential of the filament 66. The upright terminal 94 in Fig. 9 is adapted to receive a terminal of the condenser 29 to rigidly support the condenser in a vertical position in the same way that condenser 30' is supported in Fig. 5. The horizontal terminal 106 extends slightly beyond the left-hand edge of the base part 62 and, as will be pointed out, extends partially through an opening in the dielectric barrier or partition 33 when the unit is positioned in its compartment.

To more clearly illustrate this locking feature, reference is made to Figs. 1 and 2, which show the terminal 106 extending partially through an opening 33' in the partition 33. The connector 104 is inserted through the other side of the partition and engages the connector 106 to hold it rigidly in place in the opening 33'.

The interstage connecting and locking means 110 shown in Fig. 8 is connected by a short lead 112 to the tube cap connecting device 108, and consists of a hollow cylindrical part 114 disposed in angular relationship to a cylindrical plug 116 which is similar to the plug 104 shown in Fig. 5. This arrangement of tube cap and connecting means is employed in stages B, C and D, and as an electrical connector between the stages, as well as a locking device. The latter function is more clearly illustrated in compartment C (Fig. 2). The tube cap connector 108 is clipped onto the tube cap, and the cylindrical plug 116 is inserted through the opening 35' on the partition 35 to engage a horizontal cylindrical terminal 106 on stage B which is identical with the terminal 106 in Fig. 9. The angularly disposed cylindrical portion 114 is arranged in an upright position and is inclined slightly away from the partition 35. This cylindrical terminal 114 engages and holds a terminal of condenser 29 and aids in supporting the condenser in the upright inclined position shown in Fig. 2. These interlocking devices constitute the connections between the filament of one tube and the plate of the next succeeding tube, as for instance in Fig. 11; they are used to connect the filament 10F of tube 10 to the plate 11P of tube 11, the filament 11F of tube 11 to the plate 12P of tube 12, etc. The remaining connection between each successive stage constitutes jumpers between the upper terminals of the condensers, and these are denoted by the numeral 120. In the circuit diagram of Fig. 11, these connectors or jumpers 120 form the electrical connections between condensers 27 and 27', 28 and 28', 29 and 29', and 30 and 30'.

With reference to Figs. 1 and 2, a screw type terminal 122 is provided on the left-hand side of the supply and is connected to the upper terminal of condenser 26 and constitutes the ground connection for the supply. This ground connection is denoted by the numeral 122 in the circuit diagram of Fig. 11 and, in effect, constitutes one side of the high voltage input to the high voltage multiplier from the secondary winding 22 of the transformer 20 in that figure. The screw type terminal 124 appears only in Fig. 1, and is connected to the plate 10P of the tube 10. The high side of the winding 22 of the transformer 20 is connected to this terminal to complete the voltage input circuit.

Connection is made to the output terminal 60 of the power supply in compartment E by means of a suitable high voltage lead 126 shown in Fig. 3, and a plug type terminal 128 adapted to be received by one of the cylindrical connectors 60. The other connector 60 has been provided for the purpose of connecting a suitable voltage indicating device, by means of a similar plug 130. In the particular embodiment, this plug 130 extends from the end of a rubber insulating sleeve 132 fastened to the end of a glass tube 134 containing a resistor, to act as a current limiting means for a sensitive meter. This resistor is denoted by the numeral 136 in Fig. 11 and the meter is shown at 138. In the alternative, however, a somewhat smaller value of resistor and meter may be employed if the voltage is measured at the filament of the tube 10; and the resistor and meter of this alternative connection are also denoted in Fig. 11 by the numerals 136' and 138', respectively.

To further insure the rigid positioning of the stages within their respective compartments, small stops or blocks 140 are fastened to the compartment walls, just above the insulating base 62 supporting the tube socket 64. These blocks 140 prevent vertical movement of the base 62 within the compartment, the longitudinal displacement of the base being prevented by the engagement of the horizontal terminal parts 106 which extend partially into the partitions forming the compartments.

The procedure for removing one of the stages from its compartment is illustrated in Fig. 3, in connection with the final stage disposed in compartment E. To remove the stage from the compartment, the plug 104 is removed from its engagement with the cylindrical connecting part 106, and the condenser lead or jumper 120 is also disconnected from the condenser 30'. The entire unit is then moved slightly to the right, so that the base 62 is out of engagement with the blocks 140 on the compartment walls. This step in the removal of the unit is illustrated by the dotted lines position 142 of the unit. The entire assembly may then be removed from the compartment by lifting the entire assembly upwardly, as indicated by the dotted line position 144. Each of the other stages may be similarly removed from their compartments for repair or replacement without the need of any special tools, soldering irons, etc.

In the event of damage to the case 40 which houses the several stages, it is apparent that a new case may be provided and the stages may be easily removed and placed within the new housing without the necessity for any major operations. Also, in the event of damage to one or more coils 15' to 19', the entire base part 48 may be replaced merely by lifting up unit 40 from its position in the base part 48 and substituting a new base.

In high voltage power supplies of this character for use with projection tubes, a low voltage tap is usually taken from the filament of the first stage, as for instance the tube 10 in Fig. 11, for the purpose of electrostatically focusing the projection tube. This places an added load on the first stage of the power supply since it must provide the current requirements in both the high and the low voltage circuits. Under certain conditions, therefore, it may be desirable to use, perhaps, two or even three tubes in parallel in the first stage to handle the added load. It is apparent that this may be readily and easily accomplished with the particular structure illustrated in the drawings, since the additional tubes can be mounted one above the other in a parallel arrangement without otherwise modifying the arrangement and construction of the supply.

Another advantage of this invention is that the same housing arrangement can be used to provide several different voltages. For instance, the present supply which includes five stages, would produce (as illustrated) approximately 50,000 volts with a 10,000 volt input. If it is desired to provide a supply for generating but 30,000 volts, it would only be necessary to eliminate stages C and D, for instance, and bridge the upper terminal of condenser 26 (Fig. 1) to the upper terminal of condenser 30', and provide a connecting lead between the horizontal terminal 106 in compartment B to the plug connector 104 in compartment E. This would provide a three stage multiplier to produce approximately 30,000 volts with a 10,000 volt input.

Figure 12:
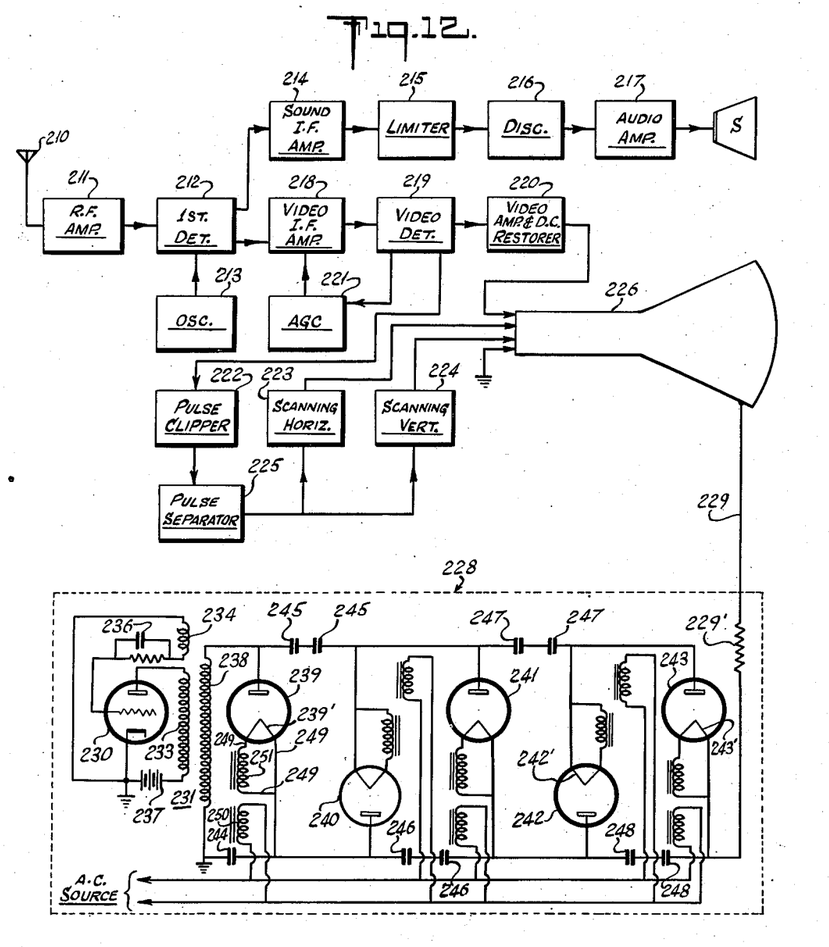
Fig. 12 is a block diagram of a television receiver embodying the invention.

In Fig. 12 I have illustrated a block diagram of a television receiver employing a power supply substantially in accordance with that illustrated in Fig. 11, and I have further illustrated a vacuum tube oscillator as the source of alternating current for driving the voltage multiplier rectifier circuit. The illustrated receiver is of the conventional type and a detailed description of each component is not deemed necessary. It includes a receiving antenna 210, a radio frequency amplifier 211, a first detector 212, and oscillator 213. The output signal obtained from the detector 212 is divided into two channels, one feeding the sound channel having an intermediate frequency amplifier 214, a limiter 215, discriminator 216, audio amplifier 217, and loud-speaker S, and the other feeding the video channel including an intermediate frequency amplifier 218, a video detector 219, and a video amplifier and direct current restorer 220. The output of the restorer 220 connects with the image reproducing tube whether of projection or non-projection type. This signal operates to vary the electron beam current while it scans the face of the tube to form the image.

Between the video amplifier 218 and video detector 220 is an automatic gain control 221 operable to control the level of the video signal. A part of the output of the detector 220 is fed through a pulse clipper 222 and pulse separator 225, whereupon it is treated by horizontal and vertical scanning circuit elements 223 and 224 which in turn are connected with the tube 226 to cause the electron beam to scan the face of the tube in synchronism with the beam in the image pick-up tube at the television broadcast station which records or televises the original object.

In addition to applying signals to the image reproducing tube 226, it is necessary to supply other voltages for energizing the filament, focusing the electron beam and accelerating the beam so that the electrons will strike the screen at the desired velocity. This last mentioned accelerating voltage is usually of the order of many thousands of volts and in some instances may be in the range of 30,000 volts and even higher. In Fig. 12 this voltage is produced by a radio frequency powered supply having a radio frequency oscillator and a voltage rectifier-multiplier circuit in which I have chosen to illustrate one adaptation of my invention. This supply is contained within the dotted lines 228 and is connected with the tube 226 by resistor 229' and lead 229.

I have found that with the application of extremely high voltages of the order generated by the power supply 228 there is a possibility of danger to the projection tube by reason of the accelerating voltage arcing through the tube to ground. I have been able to overcome this arcing or flash-back by limiting the current to the second or accelerating anode by means of the series resistor 229' whereby the current is limited to a value below that required to cause and sustain arcing. Moreover, with this high series resistance 229', which may be of the order of 200 megohms when voltages upwards of 50 kilovolts are used, it is possible to obtain increased picture brightness with substantially lower beam currents than are customary in conventional practice as I know it. These reduced beam currents also provide improved picture contrast and definition since the beam can be focused to produce a much smaller spot than would otherwise be obtainable with larger currents.

The operation of voltage multiplier-rectifier circuits of the type shown at 228 in Fig. 12 is discussed in my copending application for United States patent filed October 4, 1947, Serial No. 777,955, entitled "Television." Briefly, however, it includes an oscillator tube 230 in circuit with windings 233 and 234 of the radio frequency transformer 231. Other elements in the oscillator circuit include the grid-leak and condenser 235 and 236, a plate battery or equivalent voltage supply 237, and means for heating the filament of the tube 230, the latter having been omitted to simplify the drawing.

The oscillator voltage developed across the winding 233 of the transformer 231 is dependent on the voltage applied to tube 230 by the battery 237. As an example, this developed voltage may be of the order of 300 volts. The transformer 233 may step up this voltage as much as thirty times to produce a voltage across the winding 238 of the order of 9,000 volts.

The multiplier-rectifier circuit includes in this embodiment five rectifier tubes 239 to 243, inclusive, and nine condensers 244 to 248, inclusive. In the operation of this circuit, condenser 244 is charged to a voltage equal to the voltage appearing across winding 238, while each of the remaining pairs of series connected condensers are charged to twice that value. In the illustrated circuit, the high voltage is produced between ground (the lower side of winding 238) and the filament of the last tube 243. The charge on each of the condensers 244, 246 and 248 determines the output voltage. For example, let it be assumed that the winding 238 delivers 9,000 volts, then the sum of a 9,000 volt charge on condenser 244 and an 18,000 volt charge on condensers 246 and 248 would equal the output voltage or 45,000 volts. Since the voltage is actually multiplied five times, an arrangement or circuit which includes five tubes is commonly termed a quintupler.

From the foregoing description of the power supply 228, it is evident that the filaments 239', 240', etc. of tubes 239, 240, etc. operate at different potential levels. For instance, filament 239' is at a potential level of 9,000 volts above ground, filament 241' is at 27,000 volts, and filament 243' is at 45,000 volts. Prior methods of heating filaments of tubes in circuits of this type included a tuned radio frequency circuit energized by the radio frequency current flowing through the tube. This arrangement of course results in the application of voltage to the plates of the rectifier tubes simultaneously with the application of the filament voltage and substantially shortens the life of the tubes. Moreover, special low filament current tubes had to be employed because of the limited radio frequency power available with the use of reasonably sized components such as transformer 238 and the oscillator tube 230, critical adjustment of each resonant circuit for heating the tubes was required, which necessitated fairly stable oscillator circuits and internal capacities of the rectifier tubes themselves, and elaborate precautions had to be taken to prevent interference with the television receiver.

I have found that these difficulties can be overcome by providing means whereby the tube filaments can be heated from a relatively low frequency source such as 60 cycles, 400 cycles, and even higher frequencies and maintain the necessary insulation between each filament so that very high voltages can be developed. In this way the voltage on the filament of each tube is completely independent of the radio frequency power source and tubes having relatively high filament currents can be employed. Moreover, it is possible with my system to heat the filaments before the application of plate voltage, thereby prolonging the life of the tube. With this new circuit the practical limit of high voltage that can be generated is increased since all of the radio frequency power can be used for attaining the high voltage without having to divert part for heating the tubes.

In the power circuit shown in Fig. 12, each tube 239, 240, etc, is heated in the same manner and therefore only the circuit associated tube 239 will be described. This circuit includes a magnetic field-generating coil 250 connected with an alternating current source. Spaced from the coil 250 is a second coil 251 connected in parallel with the filament 239' by leads 249 and 249'. The coil 251 is insulated from ground and from the coil 250 so that operating potentials of the order previously discussed can be applied therebetween without danger of breakdown. The magnetic field generated by coil 250 is intercepted by the coil 251 and the voltage induced therein is sufficient to heat the filament.

In addition to the versatile qualities of the power supply, and the ease of servicing it, this invention also enables the production of a uniform and stable voltage, may embody rugged rectifying tubes having relatively high current filaments which lend stability and long life to the tube and the supply, and the particular method of arranging and interconnecting the several elements of the several stages and the stages themselves, enables the supply to be formed into a relatively small space, considering the high voltages generated therein. These important and outstanding advantages make it possible to effect a material reduction in the cost of manufacturing the supply, as well as maintenance and servicing costs.

What is claimed is:

1. A high voltage power supply comprising two or more voltage multiplying stages with each stage including at least one tube and condenser mounted to form a separate and independent structure, individual compartments for each stage including at least one opening in each of the compartment walls common to two compartments and connections between the stages with at least one of the connections between successive stages passing through the openings to hold the connected stages in position in their respective compartments.

2. A high voltage power supply comprising two or more voltage multiplying stages with each stage including at least one tube and condenser mounted to form a separate and independent structure, individual compartments for each stage including at least one opening in each of the compartment walls common to two compartments, connections between the stages with at least one of the connections between successive stages passing through the openings to hold the connected stages in position in their respective compartments, and means for inductively heating the filaments of said tubes.

3. A high voltage power supply comprising two or more voltage multiplying stages with each stage including at least one tube and condenser mounted to form a separate and independent structure, individual compartments for each stage including at least one opening in each of the compartment walls common to two compartments and connections between the stages with at least one of the connections between successive stages passing through the openings to hold the connected stages in position in their respective compartments, said stages being disposed in their respective compartments with the tubes of successive stages inverted one relative to the other.

4. A high voltage power supply comprising two or more voltage multiplying stages with each stage including at least one tube and condenser mounted to form a separate and independent structure, individual compartments for each stage including at least one opening in each of the compartment walls common to two compartments, connections between the stages with at least one of the connections between successive stages passing through the openings to hold the connected stages in position in their respective compartments, and means for inductively heating the filament of said tubes, said stages being disposed in their respective compartments with the tubes of successive stages inverted one relative to the other.

5. A power supply comprising at least two voltage multiplying stages with each stage forming an independent unit, dielectric barriers between each stage, and means for connecting the units one to the other with at least one of said connections of each unit comprising conductor means passing through a barrier for fixing the position of said unit relative to said barriers.

6. A power supply comprising a hollow base member having electromagnetic field generating means therein, dielectric means enclosing said base member, an upper housing of dielectric material having a plurality of parallel compartments therein and interconnected voltage multiplying stages in said compartments, each stage including at least one tube, and means responsive to said field for heating the filament of said tube, electrical connections between successive stages comprising locking means for securing the stages in position within their respective compartments.

7. A high voltage power supply of the multiplier type comprising a housing of dielectric material having at least two individual compartments therein, a voltage multiplier stage in each compartment, each stage comprising a vertical wall of dielectric material removably held in its compartment, a horizontally disposed rectifier tube mounted on and extending outwardly from one side of said wall, filament energizing means mounted on the other side of said wall and connected to the tube filament, said energizing means being responsive to an externally produced electromagnetic field to generate filament heating power, a condenser supported by said wall with one terminal connected to the filament heating circuit, and means for connecting one stage with the other when positioned in their respective compartments.

JOHN M. CAGE.

REFERENCES CITED

The following references are of record in the file of this patent:

UNITED STATES PATENTS

| Number | Name | Date |
|---|---|---|
| 2,045,034 | Kuntke | June 23, 1936 |
| 2,305,720 | Lindenblad | Dec. 22, 1942 |
| 2,492,746 | Harding | Dec. 27, 1949 |
| 2,499,484 | Friend | Mar. 7, 1950 |